Sept. 25, 1934.   C. G. BONDESON   1,974,910
FITTING FOR ELECTRIC CONDUITS
Filed April 16, 1931
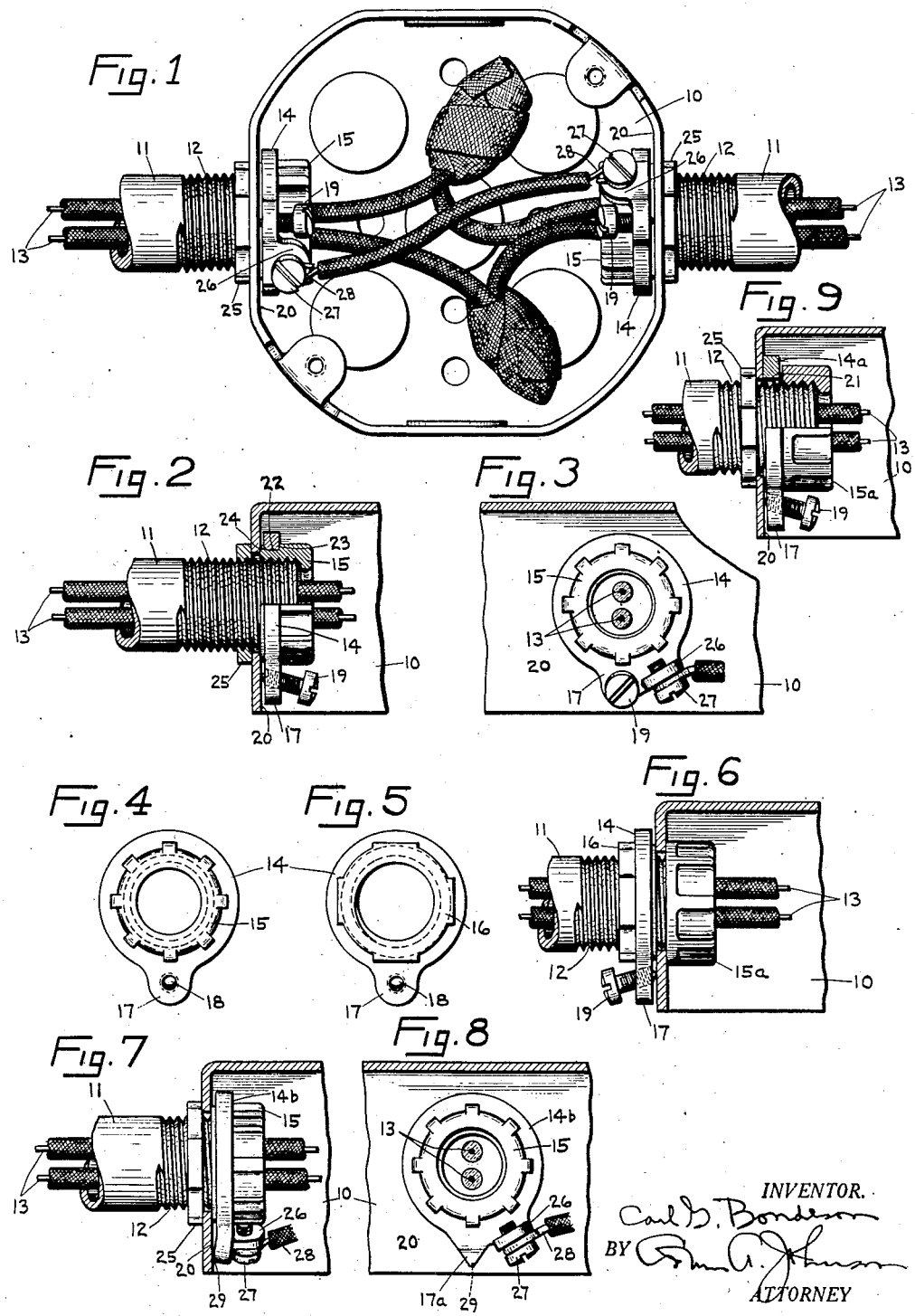
INVENTOR.
Carl G. Bondeson
BY
ATTORNEY Patented Sept. 25, 1934

1,974,910

UNITED STATES PATENT OFFICE 1,974,910

FITTING FOR ELECTRIC CONDUITS

Carl G. Bondeson, Terryville, Conn., assignor to National Engineering Corporation, Terryville, Conn., a corporation of Connecticut Application April 16, 1931, Serial No. 530,511

14 Claims. (Cl. 247—1)

This invention relates to electrical fittings, and more particularly, to fittings adapted for use with electric conduit pipe and the like.

Heretofore, it has been suggested to provide on a bushing or locknut adapted to be used on a conduit pipe inside or outside an outlet box or cabinet, a screw to cut through any paint or insulating material on the adjacent wall of the box or cabinet and thereby make a direct electrical connection between the fitting, the threaded conduit, and the box or cabinet, for grounding or other purposes. The screw also, by engaging the wall of the box or cabinet, tightly secures the fitting and prevents it from working loose by vibration or otherwise.

But, with the arrangements heretofore suggested, the screw was threaded in a projection on the bushing or locknut, and in its usual use in outlet boxes this projection prevented the fitting, bushing, or locknut from being applied in the customary way, that is, by rotating the fitting on the end while the pipe which protrudes through the hole in the outlet box remains fixed and stationary, for the projection strikes the adjacent wall of the box.

Hence, with the devices previously proposed, it was necessary to leave the pipe free to be rotated in applying the fitting thereto.

Being fixed to the fitting, the screw of the previous proposals might, when the bushing or locknut was at last tightened in place, be in an inconvenient position relative to the open side of the box, and hence in some suggested forms the fitting was provided with a plurality of spaced projections all threaded so that the screw could be placed in the projection most convenient for the adjusting operation, which necessitated more work on the part of the operator, for he would have to remove the screw from one projection and set it in another of the more convenient projections.

These difficulties are overcome by the present invention, and a still more convenient and advantageous device produced by providing a carrying member for the screw adjustably related to the bushing or locknut with which it is used, and preferably the screw-carrying member is made rotatable on or with relation to the bushing or locknut so that the fitting may be rotated on the pipe in the usual way when applying the bushing while the screw-carrying member may be held against turning, and in such a way that the screw may be most conveniently adjusted to tighten it against the box at the proper time.

According to the present invention, in its broader aspects, the screw-carrying member may be an independent piece structurally separate from the fitting so that it may be slid on the conduit end to be interposed between the wall on the outlet box and the fitting. However, it is at present considered preferable, due to the many advantages accruing therefrom, to have the screw-carrying member structurally united with the fitting, to form a permanent part thereof, and for this purpose the screw-carrying member may be rotatably mounted on a suitable bearing on the fitting, the end of which is upset to retain the member thereon.

In some cases it is desired more especially to attach a jumper wire to the locknut or bushing for grounding, and for this purpose the screw on the rotatable member may be arranged to receive and clamp the jumper wire to the rotatable member and through the latter connect to the bushing or locknut and related parts to the grounding system.

Hence it will be seen that the rotatable member may have provision for either box engagement or jumper wire engagement. But, so that a single fitting may be used for either or both purposes, the rotatable member is preferably provided with two screws, one to engage a wall of the box and the other to secure the grounding or jumper wire.

However, if it is desired to have only one screw for the grounding or jumper wire, the rotatable carrying member is preferably provided with a lug or projection to dig into the surface of the box as the fitting is tightened in place, and thereby hold the fitting against becoming loosened due to vibrations and at the same time electrically and mechanically connect the fitting conduit and wall of the box.

Other features and advantages will hereinafter appear.

In the accompanying drawing which illustrates several embodiments of the present invention—

Figure 1 shows an outlet box from its open side with two conduits entering the same, and the fitting in accordance with the present invention applied to each conduit.

Fig. 2 is a partial sectional view showing the wall of the outlet box in section, the conduit in elevation, and part of the device of the present invention in section while the other part is in elevation, the rotatable member being in this case made without the screw for securing a jumper wire to the fitting.

Fig. 3 is an elevation of the fitting shown in Fig. 1. In this case, both the screw for impinging against the wall of the outlet box and the screw for securing the jumper wire to the fitting being provided.

Fig. 4 is an elevation of the fitting shown in Fig. 2.

Fig. 5 is a similar view of a modification wherein the fitting constitutes a permanent part of a locknut.

Fig. 6 is a view similar to Fig. 2 of the fitting shown in Fig. 5.

Fig. 7 is a view similar to Fig. 2, showing the fitting being provided only with the screw to secure a jumper wire to the fitting, the rotatable member being provided with other means for digging into the wall of the outlet box when the fitting is secured in place.

Fig. 8 is a view like Fig. 3 of the fitting shown in Fig. 7.

Fig. 9 is a view like Fig. 2, showing a modification of this invention wherein the rotatable member does not constitute a permanent part of the bushing or locknut but is clamped in place by either of the latter with which it happens to be used.

As above pointed out, the fitting of the present invention is intended principally for use in connection with an outlet box 10 and conduits 11 which extend into the outlet box through holes in the wall or walls thereof. The conduit 11 is usually provided with a screw-thread 12 and contains conductors 13 respectively, to be connected together in pairs within the outlet box, or to be connected to an attachment plug, receptacle, switch, or the like.

To secure the threaded end 12 of the conduit pipe 11 in the outlet box, it is customary to provide a locknut on the conduit adapted to engage the outer surface of the wall of the outlet box through which it extends while on the inner side a threaded bushing is connected to the threaded end of the conduit pipe. The usual method of fastening the pipe and box securely together consists of turning the bushing on the conduit until an overhanging flange on the bushing securely engages the end of the pipe, and then adjusting the locknut from the outside of the box so that the box is securely clamped between the locknut and bushing, the pipe being during this operation held against turning.

In many instances, it is desired to mechanically and electrically connect various conduits and boxes in a wiring system so that these parts may be be conveniently grounded. In some situations it is satisfactory to merely make good electrical and mechanical connections between the conduit or the fitting carried thereby and the outlet box. To do this, it has heretofore been proposed to provide the bushing or locknut with a rigid projection having a hole threaded to receive a screw which, after the bushing or locknut was securely tightened in place, could be adjusted so as to dig into the box and make electrical contact therewith and at the same time take up any play or looseness between the bushing and the conduit or the locknut on the outside of the box and the box wall. This screw consequently performed the further function of preventing the bushing, locknut and conduit from jarring loose due to vibrations imparted thereto by the support upon which the box or conduit was mounted.

In other cases it was desired to provide the fitting, i. e. the locknut or bushing, with a connection having a hole to receive a screw under the head of which a jumper wire might be secured. This jumper wire was at its other end connected to a grounding medium or another fitting in the box.

As pointed out above, these previous proposals, each involving an integral extension on the locknut or bushing, could not be used in the usual way very often because the extension would prevent the fitting from being rotated while in place within the box, due to contact with the adjacent walls of the box, and accordingly it was necessary to leave the conduit pipe free for rotation when making an installation; this operation being inconvenient in many cases. Also, the extension carrying the screw would often stop in a location very inconvenient for the operator to get at with a screw-driver for final adjustment.

These disadvantages are overcome by the present invention which, as will be seen from the accompanying drawing, involves the provision of a member 14 which is rotatable independently of the bushing 15 or locknut 16 with which it is used. This rotatable member is provided with a projection 17 having a hole 18 for the reception of a screw 19. This hole is so arranged that the screw is directed toward walls 20 of the box through which the pipe extends.

As shown in Fig. 9, the member 14a is provided with an aperture 21 so that the member 19a can be slid directly over the thread 12 of the conduit 11 before the application of the usual bushing 15a, to be interposed between the face of the bushing and the wall of the outlet box, and yet to be rotatable about the axis of the conduit pipe until the final adjustment of the bushing 15 or nut 16a.

However, it is preferable, as shown in the other figures, to have the rotatable member 14 form a permanent part of the bushing 15 as shown in Figs. 2 and 4, or form a permanent part of the locknut 16, as shown in Figs. 5 and 6.

To do this, the bushing 15 is provided with a reduced external portion forming a bearing 22 on which the rotatable member 14 is mounted, the latter being confined between a shoulder or thrust-bearing 23 and an upset portion 24 on the end of the bushing 15 or locknut 16, as the case may be—the structure being clearly shown in Fig. 2.

When the rotatable member 14 of the form shown in Figs. 1 and 2 is used, the bushing 15 is tightened in place in the usual way until the wall 20 of the outlet box is firmly clamped between the locknut 25 and the face of the bushing. Then the rotatable member, being free for such purpose, may be adjusted by rotary movement about the axis of the conduit pipe 11 so that the screw 19 carried thereby be brought into the most convenient position for the electrician to tighten it in place. Upon tightening the screw, the end of the screw which is preferably pointed, digs into the wall of the outlet box, piercing any paint or enamel which may be contained thereon, and at the same time tends to force the rotatable member 14 away from the wall of the box, thereby pushing it against the shoulder or thrust bearing 23 and tightly forcing the threads of the bushing against the threads of the conduit pipe, at the same time drawing the conduit pipe into the box and forcing the locknut 25 against the outer surface of the box.

In this way, good electrical and mechanical connection is assured between the conduit 11, bushing 15, and the outlet box 10. When several conduits 11 enter the same box and each is provided with a fitting as above described, the several conduits are electrically and mechanically connected together through the metal of the outlet box, and the connection serves to prevent the parts from vibrating loose.

When the rotatable member 14a is employed, this, as will be remembered being so arranged as not to constitute a permanent part of the locknut or bushing, may be held in position where the screw 19 will later be conveniently accessible for the electrician, while he at the same time tightens the bushing 15a and nut 16a onto the end of the conduit. After this has been done, the tightening of the grounding screw 19 will bite into the outlet box and force the threads of the bushing 15a into firm contact with the threads on the conduit pipe 11 and at the same time will draw the conduit pipe into the box, jamming the lock-nut 16a against the margin of the hole in the box through which the pipe extends to establish a good electrical connection between these several parts, and to prevent these parts from jarring loose.

In some cases it is desired merely to make provision so that a jumper or grounding wire may be connected to the several conduit pipes entering a box. For this purpose, a rotatable member 14b may be provided (see Figs. 7 and 8). In this form, the member 19b is provided with an arm 26 projecting therefrom at right angles and provided with a threaded hole for receiving a screw 27 under the head of which and upon the arm 26 the end of a jumper wire 28 may be secured. This member 14b is, like the member 14 and 14a, rotatable about the axis of the conduit pipe and may be supported directly on the conduit pipe as is the rotatable member 14, or it may be supported on the bushing 15 as is the member 14. Hence, it may be adjusted to such a poistion that the electrician may conveniently secure the jumper wire thereto, regardless of the point at which the bushing 15 happens to come to rest when it is being turned to tighten the conduit 11 in the outlet box 10.

If the member 14 is interposed between the bushing and the wall 20 of the outlet box 10 like the member 14a shown in Fig. 9, it will, as a result, be firmly held against turning and in its adjusted position when the bushing is adjusted to its final position. However, when the member 14b is rotatable on the bushing, as is preferable and as is indicated in Fig. 7, means are provided for securely tightening it against the bushing 15 and the outlet box 10. This may be accomplished in two ways—for instance, as shown in Figs. 7 and 8, the rotatable member 14b may have an angularly bent arm 17a, the corner 29 of which bites into the metal of the outlet box when the bushing 15 is being finally tightened, and in addition is placed under sufficient tension so that it will hold the bushing 15 and pipe 11 and locknut 16 from jarring loose due to vibrations.

However, it is preferable, as shown in Figs. 1 and 3, to have the projection 17 with its screw 19 and the arm 26 with its screw 27 on the rotatable member 14 so that this single device may be used for all necessary purposes. It may be used when it is merely desired to make mechanical and electrical connection to the oulet box and to hold the parts from jarring loose due to vibrations. Or, it may be used when it is only desired to have provision for jumper or ground wires, or it may be used for both purposes simultaneously, in which case it is extremely advantageous. Not only is provision made for receiving and attaching a jumper wire but the bushing and locknut are prevented from vibrating loose and are held in good electrical and mechanical connection with the outlet box.

In the above description it has been considered that the rotatable members 14, 14a and 14b are associated with bushings 15 and 15a. However, it should be clearly understood that the member may be associated with the locknut 16 as shown in Figs. 5 and 6, and used on the outside of the box. In many cases it may be more conveniently so used because greater freedom of movement is usually had outside the box for the tightening of the adjusting screw 19. However, the invention is extremely important and advantageous when used within the outlet box for it is preferable to provide the jumpers inside the outlet box, as shown in Fig. 1. Inside the box the available space is extremely limited and the bottom wall or adjacent side walls of the outlet box would prevent the bushing from turning if the screw-carrying member were rigidly secured thereto as with heretofore proposed devices. In the device of the present invention, however, the bushing may be screwed onto the pipe in the usual and most convenient way after which or during which the rotatable member is brought to a position for the convenient adjustment of the screw 17 or 27, or both.

If the pipes entering the outlet box are to be connected by jumpers, it is usually best to have these rotatable members 14 located within the box so that the jumper wire as well as the current-carrying wires 13 will be protected against damages.

Variations and modifications may be made within the scope of this invention and portions of the improvements may be used without others.

Having thus described the invention, what is claimed as new and for which it is desired to obtain Letters-Patent, is:—

1. A fitting for electric conduit pipe comprising a threaded body portion adapted to engage threads on the conduit pipe and adapted to engage a wall of a box through which the pipe extends; a screw-carrying member rotatably mounted on the body, the screw of which is directed toward and adapted to engage the box wall through which the pipe extends.

2. A fitting for electric conduit pipe comprising a threaded body portion adapted to engage threads on the conduit pipe and adapted to engage a wall of a box through which the pipe extends; a screw-carrying member rotatably mounted on the body, the screw of which is directed toward and adapted to engage the box wall through which the pipe extends; and a thrust bearing on the body adapted to be engaged by said member when the screw is securely tightened against the wall of the box.

3. A fitting for electric conduit pipe comprising a threaded body portion adapted to engage threads on the conduit pipe and adapted to engage a wall of a box through which the pipe extends; a screw-carrying member rotatably mounted on the body, the screw of which is directed toward and adapted to engage the box wall through which the pipe extends; a thrust bearing on the body adapted to be engaged by said member when the screw is securely tightened against the wall of the box; and a flange on the body securing the screw-carrying member thereto as a permanent part of the fitting.

4. A fitting for electric conduit pipe comprising a threaded body portion adapted to engage threads on the conduit pipe and adapted to engage a wall of a metal box through which the pipe extends; a member rotatably mounted on the body; and a point on the member extending beyond the plane of the latter to bite into the wall of the box and penetrates through any non-metallic surface coating thereon when the fitting is tightened against the said wall.

5. A fitting for electric conduit pipe comprising a threaded body portion adapted to engage threads on the conduit pipe and adapted to engage a wall of a metal box through which the pipe extends; an annular member rotatably mounted on said body and having an arm projecting therefrom; and means on said arm adapted to bite into the wall of the box and penetrates through any non-metallic surface coating thereon when the fitting is tightened against the said wall.

6. A fitting for electric conduit pipe comprising a threaded body portion adapted to engage threads on the conduit pipe and adapted to engage a wall of a metal box through which the pipe extends; an annular member rotatably mounted on said body and having an arm projecting therefrom; and a point on the arm adapted to bite into the wall of the box and penetrates through any non-metallic surface coating thereon when the fitting is tightened against the said wall.

7. A fitting for electric conduit pipe comprising a threaded body portion adapted to engage threads on the conduit pipe and adapted to engage a wall of a metal box through which the pipe extends when screwed onto the pipe; a member rotatably mounted on the body so that it may be held against turning while the body is screwed onto the pipe; a binding screw on said member adapted to receive a jumper or grounding wire and secure the same to the member; and means on the member adapted to bite into the wall of the box and penetrates through any non-metallic surface coating thereon when the fitting is tightened against the said wall.

8. A fitting for electric conduit pipe comprising a threaded body portion adapted to engage threads on the conduit pipe and adapted to engage a wall of a box through which the pipe extends; a screw-carrying member rotatably mounted on the body, the screw of which is adapted to receive a jumper or grounding wire and secure the same to the member; and a screw carried by the rotatable member directed toward and adapted to engage a wall of the box through which the pipe extends.

9. A bushing for an electric conduit pipe comprising a threaded body having an overhanging flange to engage the end of the pipe which projects into a hole in a wall of a box and an end adapted to engage the said wall, and a grounding member rotatably mounted on the bushing between the said ends of the same so as to be adjustable about the axis of the bushing after the end of the bushing securely engages the wall of the outlet box, said box being metallic and said member having means to penetrate through any non-metallic surface coating on the box.

10. A bushing for an electric conduit pipe comprising a threaded body having an overhanging flange to engage the end of the pipe which projects into a hole in a wall of a box and an end adapted to engage the said wall, and a grounding member rotatably mounted on the bushing between the said ends of the same so as to be adjustable about the axis of the bushing after the end of the bushing securely engages the wall of the outlet box, said member having a screw directed toward the box to engage the wall thereof.

11. A bushing for an electric conduit pipe comprising a threaded body having an overhanging flange to engage the end of the pipe which projects into a hole in a wall of a box and an end adapted to engage the said wall, and a grounding member rotatably mounted on the bushing between the said ends of the same so as to be adjustable about the axis of the bushing after the end of the bushing securely engages the wall of the outlet box and the bushing is held against turning by means of a lock nut engaging the outer surface of the wall of the box, said member having a binding connection for a grounding wire which may be brought to accessible position by rotation of said grounding member.

12. A bushing for an electric conduit pipe comprising a threaded body having an overhanging flange to engage the end of the pipe which projects into a hole in a wall of a box and an end adapted to engage the said wall, a grounding member rotatably mounted on the bushing between the said ends of the same so as to be adjustable about the axis of the bushing after the end of the bushing securely engages the wall of the outlet box, said member having a screw directed toward the box to engage the wall thereof, and a screw disposed radially to receive a grounding wire.

13. A fitting for electric conduit pipe comprising a threaded body portion adapted to engage threads on the conduit pipe and adapted, through cooperating with another member threaded on the conduit pipe, to engage a wall of a box through which the pipe extends to be secured to the pipe and box and to secure the pipe in the box; a member rotatably mounted on the body so that it may be held against turning while the body is screwed onto the pipe; a binding screw on said member adapted to receive a jumper or grounding wire and secure the same to the member; and means operative when the fitting is tightened against the wall of the box for holding the member against rotation.

14. A fitting for electric conduit pipe comprising a threaded body portion adapted to engage threads on the conduit pipe and adapted, through cooperating with another member threaded on the conduit pipe, to engage a wall of a box through which the pipe extends to be secured to the pipe and box and to secure the pipe in the box; a member rotatably mounted on the body so that it may be held against turning while the body is screwed onto the pipe; a binding screw on said member adapted to receive a jumper or grounding wire and secure the same to the member; and another screw carried by the rotatable member and adjustable to hold the member against rotation.

CARL G. BONDESON.